US005312219A

United States Patent [19]

Brown

[11] Patent Number: 5,312,219

[45] Date of Patent: May 17, 1994

[54] NARROW AISLE LIFT TRUCK

[75] Inventor: Frederick L. Brown, Bellheath, United Kingdom

[73] Assignee: Translift Material Handling Limited, United Kingdom

[21] Appl. No.: 820,886

[22] PCT Filed: Jul. 6, 1990

[86] PCT No.: PCT/GB90/01050

§ 371 Date: Jan. 14, 1992

§ 102(e) Date: Jan. 14, 1992

[87] PCT Pub. No.: WO91/01938

PCT Pub. Date: Feb. 21, 1991

[30] Foreign Application Priority Data

Jul. 29, 1989 [GB] United Kingdom ................ 8917414

[51] Int. Cl.[5] ........................ B66F 9/10; B62D 53/02

[52] U.S. Cl. .................................. 414/633; 180/6.48

[58] Field of Search ........................ 414/633; 180/6.48

[56] References Cited

U.S. PATENT DOCUMENTS

| | | | |
|---|---|---|---|
| 2,957,533 | 10/1960 | Lewis et al. | 180/6.48 |
| 2,986,295 | 5/1961 | Shaffer | 414/633 |
| 3,031,024 | 4/1962 | Ulinski | 180/6.5 |
| 3,901,339 | 8/1975 | Williamson | 180/6.48 |
| 4,301,881 | 11/1981 | Griffin | 180/6.48 |
| 4,470,475 | 9/1984 | Carlson | 180/6.48 |
| 4,621,562 | 11/1986 | Carr et al. | 180/6.48 X |
| 4,914,592 | 4/1990 | Callahan et al. | 18/6.48 X |

FOREIGN PATENT DOCUMENTS

| | | | |
|---|---|---|---|
| 0303413 | 2/1989 | European Pat. Off. . | |
| 1049307 | 1/1959 | Fed. Rep. of Germany | 414/633 |
| 1209450 | 1/1966 | Fed. Rep. of Germany . | |

*Primary Examiner*—David A. Bucci
*Attorney, Agent, or Firm*—Learman & McCulloch

[57] ABSTRACT

A forklift truck has front and rear wheeled sections coupled by a central pivot. The wheels of the rear section are driven independently of one another. In order to prevent tire scrub when the two sections are in an extreme position in which the center of turning lies under or close to one of the driven wheels, the driving of the rear wheels controlled to stop or reverse the drive of the wheel closer to the turning point.

4 Claims, 3 Drawing Sheets

NARROW AISLE LIFT TRUCK

TECHNICAL FIELD

This invention relates to narrow aisle lift trucks.

BACKGROUND OF THE INVENTION

When a fork lift truck is driven in other than a straight line, the wheels nearer the centre of turning travel a smaller distance than the outer wheels.

EP 0 303 413 shows a narrow aisle lift truck having a body and a mast structure which are pivoted together about a main vertical or king pin axis. The body has wheels on a first common axis and the mast structure has feet with wheels on a second common axis. When the axes are parallel the parts are pivotally related for straight ahead, or straight back, travel. The mast has a carriage for elevation of forks which are for insertion and retraction of a load to and from the stack in which the aisle extends. Steering is effected by driving the mast structure about the king pin by any suitable means. A truck having all of these mentioned features is herein called "of the kind referred to".

A truck of this kind may, in an extreme position, have the said axes at an angle of the order of 90 deg. to one another. This can result in skidding and tire wear.

DE 1049307B shows a truck having front wheels only driven by separate motors which can be controlled individually as to direction of speed. This provides a solution to the problem of the inner and outer wheels moving differently, but because those motors act as the only steering means, there are other problems introduced.

DE 1209450B uses two hydrostatic motors, one for each driven wheel, which can run at different speeds when the truck is in curvilinear motion, but this only goes some way towards solving the problem and does not cater for the possibilities of extreme movement of the steering such as those mentioned in the foregoing paragraphs.

GB 2 167 024 shows a vibratory trench roller with four rolls, which can be controlled by so-called tank steering in which two rolls on one side are driven in the same or the opposite direction as those on the other side. However, this does not give satisfactory steering possibilities for a wheeled forklift truck.

The object of the invention is to provide improvements.

SUMMARY OF INVENTION

According to the invention, a forklift truck comprises a rear section having a pair of driven wheels on a common axis, a front part pivoted to the rear part about a vertical axis, said front part being provided with a pair of non-driven wheels on a second common axis and also with a mast provided with the lift forks, and steering means for turning the second part relative to the first part, a pair of separate and individually controlled drive motors, one for each rear wheel and control means arranged to vary both the speed down to zero, and direction of drive of one motor, relative to the other according to the steering angle.

As the steering angle increases, the inner wheel may be driven at a slower speed then the outer one, and then disengaged from drive. Depending upon the geometry, it may then be driven in the opposite direction to the outer wheel.

For any one truck the choice depends upon the geometry; and at any one time it depends upon the steering angle.

Preferably the two motors are under the control of circuitry (software) with an input from the steering wheel position, or from micro-switches contacted by parts of the steering gear, according to the angle of turning. The arrangement is most desirably such that in the straight line position both wheels are driven synchronously, and drive to the inside wheel—whichever one is involved according to the direction of turning—is progressively reduced as the radius of turning is reduced, down to zero, or first down to zero then reversing of the inside wheel when the steering is near or is on full lock, according to the geometry and design of the truck.

It will be appreciated that when the truck turns and goes forward to the aisle side face the outer wheel is driven forwardly and the inner wheel is stopped or reversed; when the truck is reversed to withdraw from the aisle side face and straighten up, it is the outer wheel which is reversed and the inner wheel which is stopped or driven forwardly.

The second axis wheels may be located at the end of projecting feet, and in any event the design preferably allows the load to descend to ground level. Any projection may assist with stability to prevent the truck overturning especially when in extreme positions.

The possible geometry of the truck according to the invention may be considered thus: if the centre of turning, which is the intersection of straight lines containing the respective axes of the two pairs of wheels coincides with the ground contact point of the inside driven wheel, then drive of the outside wheel alone is possible with the inside wheel effectively pivoting on the ground. But if said centre is inside the track of the driven wheels then the inner wheel must turn backwards in relation to the outer wheel if extreme tire wear and loss of control is to be prevented. However, in addition to avoiding or reducing tire wear, the arrangements according to the invention give advantages in maneuvering and maintains control of the vehicle at such times.

In said EP, the truck has an extensor mechanism for projecting the forks and load into and out of the stack at the side of the aisle. Such a mechanism requires to be particularly rigid in order to support adequate load in the fully extended position, and the effect of the extended load has to be taken into account in calculations relating to the potential stability of the truck. This places severe limits on the designer. In the present invention, the extensor mechanism can be avoided thus providing greater simplicity and rigidity in terms of mast, carriage and forks and increasing the limits of load carrying and transferring ability without incurring instability.

Such a simpler design, according to the invention, has relatively short projecting feet so as to allow for maximum movement of the load forks with the truck (instead of relative to the truck) in the direction transverse to the aisle e.g. for load insertion without coming into contact with the stack face of the aisle, and the same considerations apply in load extraction. Such short feet themselves tend to reduce truck stability, although the absence of the extensor mechanism increases stability to a greater extent. However, it is believed that the increased maneuverability and stability, together with the avoidance of the need for the load extensor retractor mechanism is a much greater advantage than the corresponding disadvantage of the need to provide control mechanism for varying wheel speed in relation to steering wheel position.

THE DRAWINGS

The invention is now more particularly described with reference to the accompanying drawings wherein.

DETAILED DESCRIPTION

Figure 1:
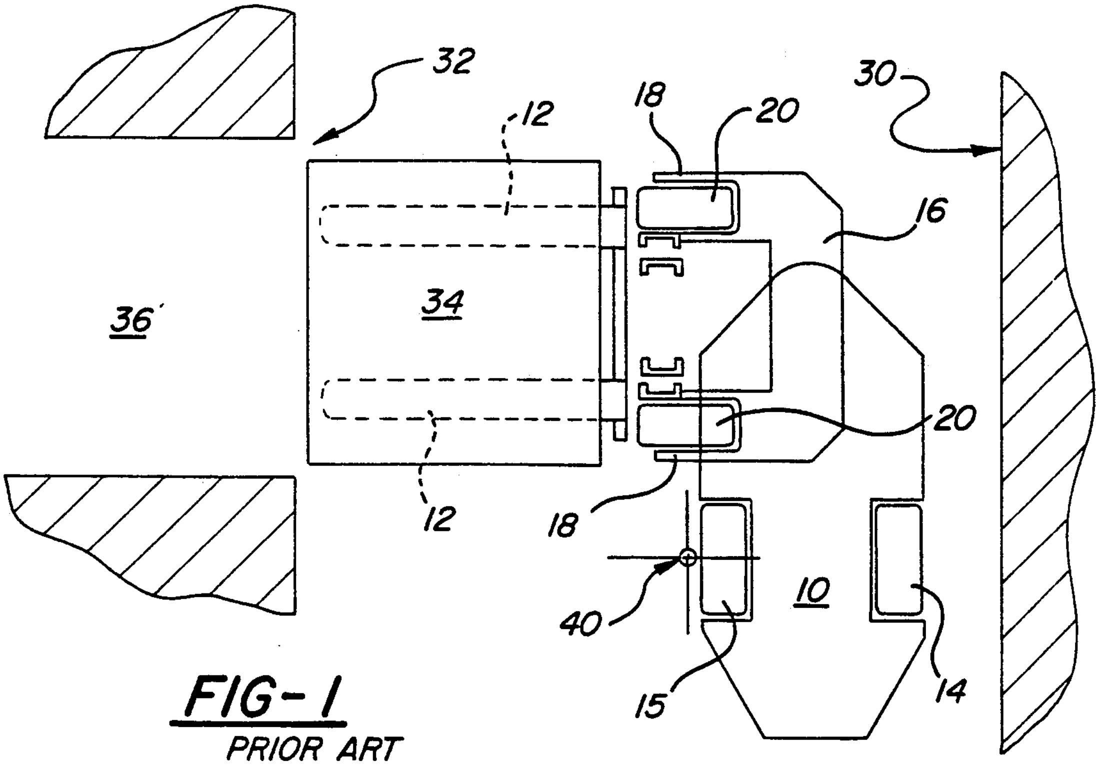
FIG-1 PRIOR ART
FIG. 1 is a schematic plan view showing a prior art vehicle maneuvering in a narrow aisle.

Turning now to FIG. 1 (prior art) this shows a forklift truck provided with a pair of wheels (14, 15) located on a common axis, and carried by a front body portion or section (10) which is pivoted to a second back part or section of the truck (16) having short forwardly projecting limbs (18) carrying a pair of non-driven wheels (20) located on a second axis. The part (16) is provided with a mast carrying forks (12) to support the load (34). This truck is primarily intended to be turned to the left only, and for this purpose wheel (14) is driven and wheel (15) is freely rotatable but not driven. The truck is shown in an aisle defined between a pair of parallel aisle faces (30, 32) and it is maneuvering a load (34) for insertion into the space 36. If the load were to be inserted in the face 30, the truck would have to be driven round and positioned in the aisle facing in the opposite direction. The centre of turning of the truck is the point (40) which is the intersection of the axes of the front and rear wheels. It lies just outside the wheel base of the wheels (14, 15). This truck had certain advantages in its maneuverability but it was tiring to drive because the steering was very heavy, and inconvenient in that it always had to insert and remove loads on the lefthand side of the vehicle when travelling in a forward direction.

Turning now to FIGS. 2-5, a forklift truck constructed according to the invention comprises an articulated body having a first part or rear section (10) which carries propulsion means, for example storage batteries (B) and electric motors (M) together with the driver's seat and controls (C) for propelling the truck either in a forwardly or rearwardly direction. The weight is concentrated rearwardly as low down and widespread as possible in the interests of stability of the truck especially when carrying a load on the forks (12). In considering stability it is to be recognized that the load may be elevated by the forks on the mast (15) and the latter may be telescopically height extendable in conventional fashion. The mast may be tilted back in conventional fashion when carrying the load, and of course stability needs to be considered when the truck is on full steering lock.

The back section of the truck has a pair of coaxial driven wheels (14), the overall width (i.e. track) plus the usual clearance of which dictates the aisle width of the warehouse or store in which the truck is to be used.

The second part or front section of the truck (16) has short limbs (18) carrying the second pair of coaxial wheels (20). These may be of the same track as the wheels (14). The two parts (10, 16) are pivoted together on a main vertical king pin or like in the part shown by the reference (22). Steering means are provided for turning the part (18) relative to the part (10) when the steering wheel (24) is turned in conventional manner.

The centre of turning in FIG. 1 is shown as the point (40) which is intersection of a line drawn through the two axes of the respective wheel sets. As long as this point (40) lies outside the respective track dimensions the operation can be accomplished with the inner driven wheel merely turning at a lower speed than the outer driven wheel but in the same direction. The aisle width possible, with standard industry clearance relative to body width is shown to approximately correct scale in all of FIGS. 2-5.

Figure 3:
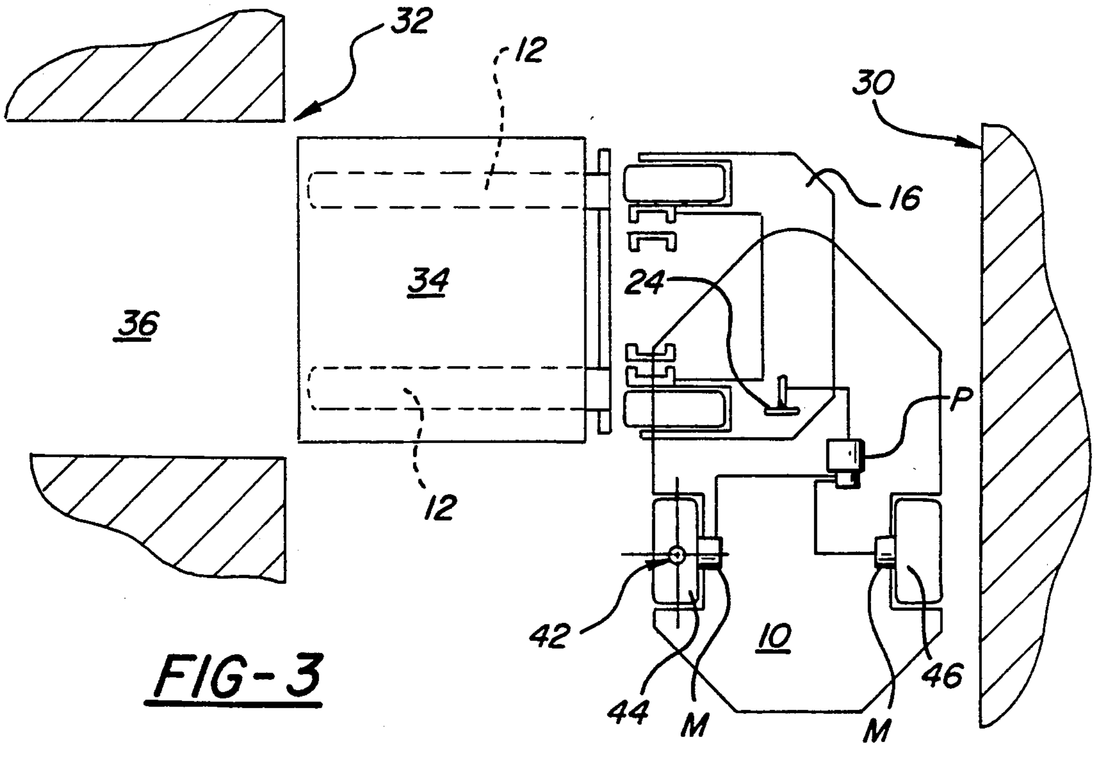
FIGS. 3 to 5 are schematic plan views similar to FIG. 1 but showing three different trucks according to the invention.
Figure 2:
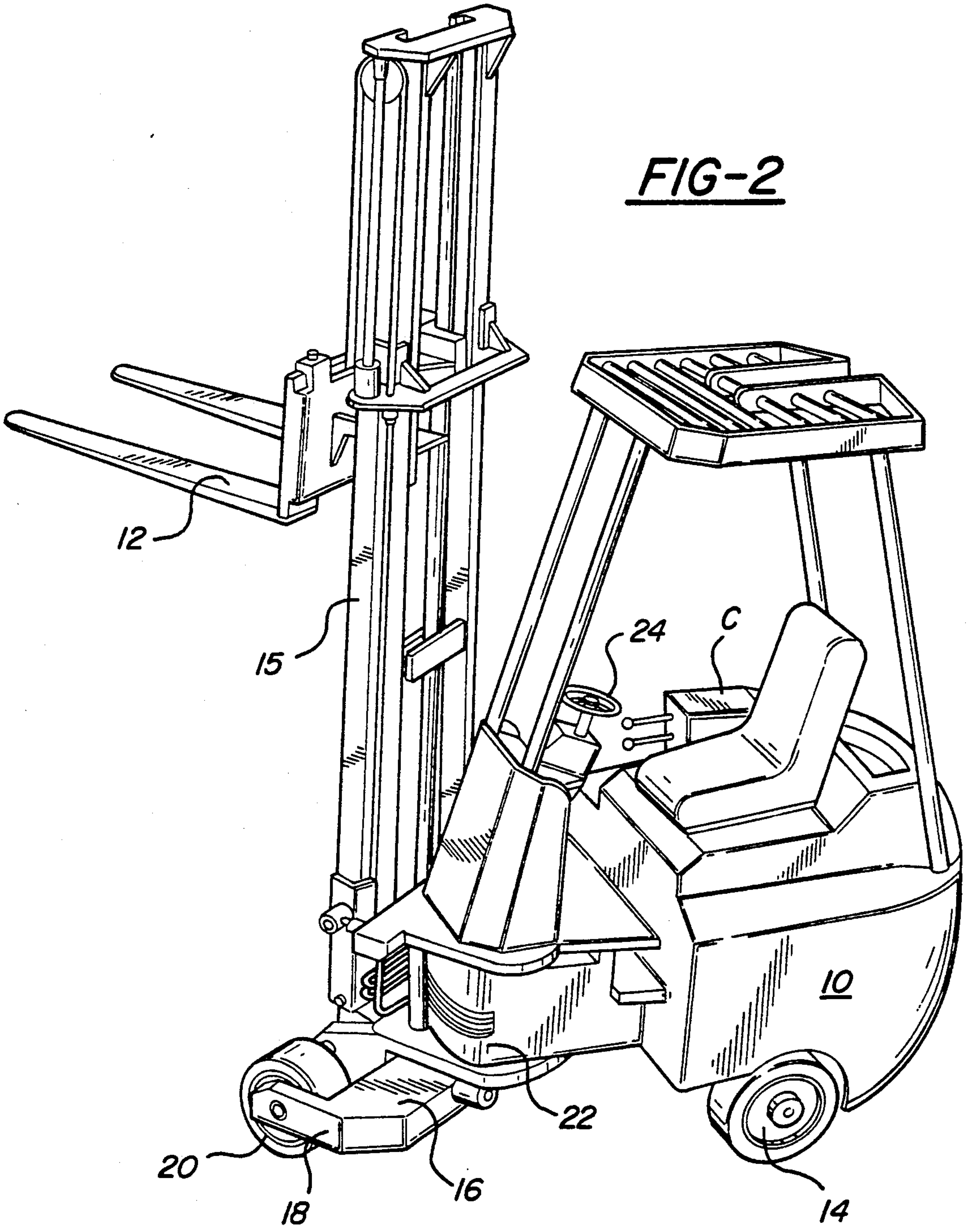
FIG. 2 is a perspective view of a truck according to the invention.

FIG. 3 shows the truck of FIG. 2, but drawn to the same scale and in the same aisle location as FIG. 1. In this case, because of the invention, the truck can be used to insert and remove loads to left or right, and the disadvantages with the truck of FIG. 1 are avoided. Additionally, it will be noted that the proportions of the truck can be changed whilst working within the same set of parameters as to load, size and weight and aisle width. In particular the truck can be made wider thus increasing stability. Control means, such as circuitry (software) (P), are provided for controlling the rotational speed and direction of the rear wheels 14 in relation to the angular position of the front section 16 with respect to the back section 10 (i.e., the turn angle). The control means (P) receives input from the steering means representative of the turn angle. The control means (P) further controls the relative speed and rotation of the wheels 14 through control of the motors (M). In the case of FIG. 3, the front section 16 has been turned relative to the back section 10 to such a degree that the center of turning (42) lies in the central point of contact of the radially innermost wheel (44) with the ground. This wheel (44) is then held stationary insofar as rotation about its axis is concerned whilst the radially outermost wheel (46) may be driven forwardly for load insertion, or rearwardly during load removal. It will be understood that if inserting or removing a load from the opposite side, the centre of turning will lie under the wheel (46) and that will be the wheel which is disengaged from drive and or driven rearwardly during load insertion.

Figure 4:
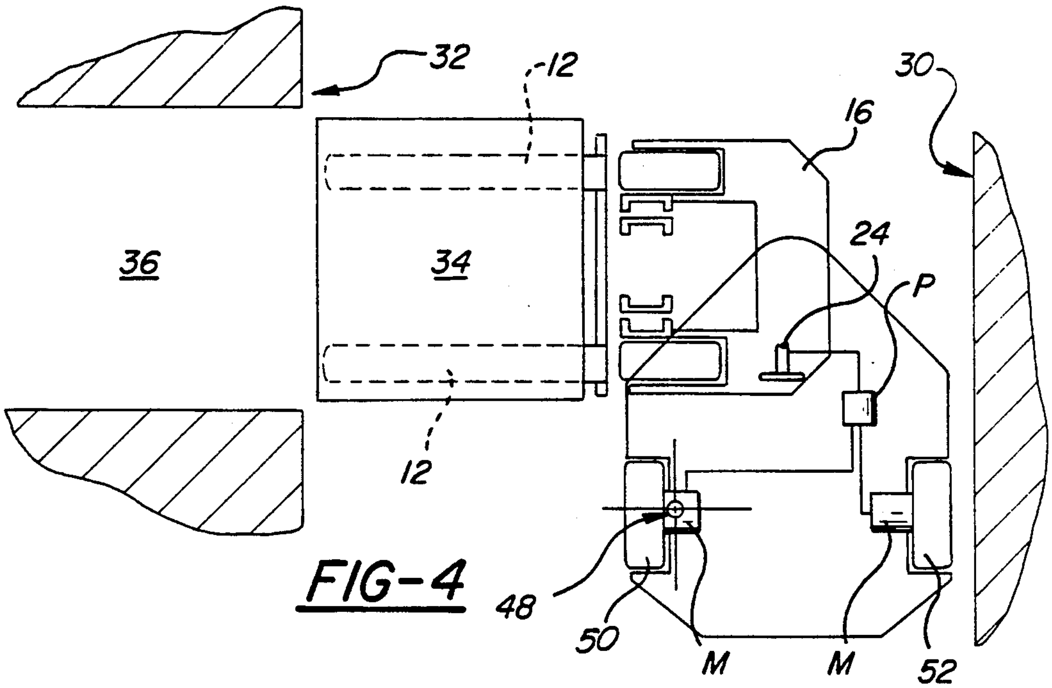

FIG. 4 goes one step further. Again keeping all other things equal the track is still wider, the stability/load possibility is increased, and the centre of turning now lies within the track, that is between the wheels (50,52). In this position inner wheel (50) is driven in the reverse direction relative to the outer wheel 64.

Figure 5:
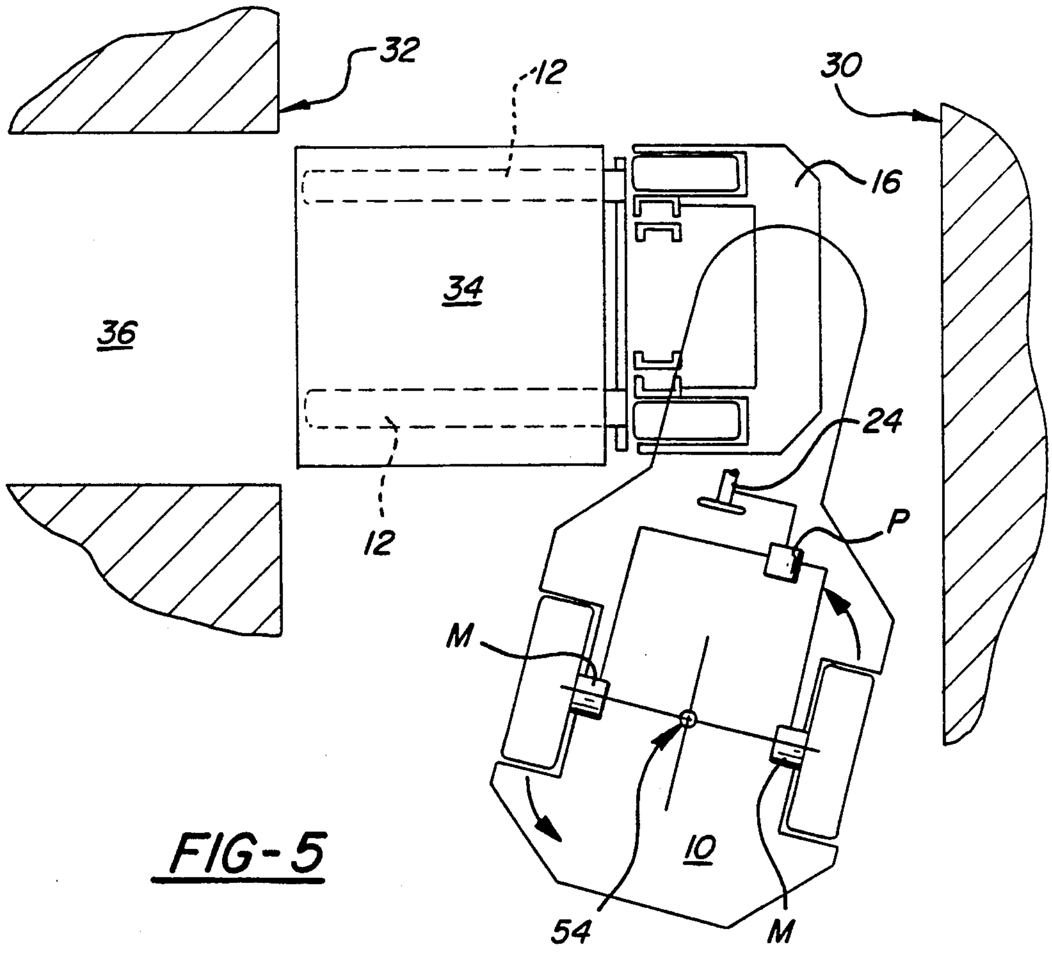

FIG. 5 shows a modification of the FIG. 4 arrangement when the two parts are arranged to be capable of being turned through more than 90 deg thereby forming an acute angle between the front and back sections. The centre of turning (54) can now be brought to the midpoint of the driven wheel track, so that again by driving the wheels in opposite directions but now possibly at the same speed instead of driving the inner wheel in the opposite direction at reduced speed, the load can be moved laterally of the aisle in the final part of the load insertion, or the initial part of the load removal operation.

We claim:

1. A forklift truck construction comprising:

an articulated body having a back section, a front section, and a pivot connection interconnecting said sections for enabling said front section to pivot relative to said back section, said front section including a mast having forks for elevating a load;

a pair of rear wheels mounted on said back section for rotation about a first common axis;

a pair of forward wheels mounted on said front section for rotation about a second common axis;

propulsion means including a pair of reversible independent drive motors one of which is operatively coupled to one of said rear wheels and the other of which is operatively coupled to the other of said rear wheels, said drive motors being operable to rotate said rear wheels to propel said truck in forward and rearward directions;

steering means for pivoting said front section relative to said back section to position said front section in any selected one of a number of different angular positions relative to said back section defining an associated turn angle therebetween for steering said truck;

and control means operatively coupled to said propulsion means and said steering means and responsive to changes in said turn angle for controlling rotational direction and speed of each of said rear wheels in relation to one another for steerably maneuvering said back section in relation to said front section as a function of said turn angle to supplement the steering capabilities of said steering means and thereby enhance the overall maneuverability of said truck.

2. The construction of claim 1 wherein each of said rear wheels has an associated ground contact area and said front section is movable to a maximum turn angle in which a center of turning point defined by an intersection of lines drawn through said first and second axes lies in said ground contact area of one of said rear wheels, said control means acting to stop rotation of said one rear wheel when said front section is moved to said maximum turn angle.

3. The construction of claim 1 wherein said front section is movable to a maximum turn angle in which a center of turning point defined by an intersection of lines drawn through said first and second axes lies on said second axes between said rear wheels, said control means acting to rotate said rear wheels in opposite directions when said front section is moved to said maximum turn angle.

4. The construction of claim 3 wherein said maximum turn angle is an acute angle and said center of turning point lies midway between said rear wheels.

* * * * *

UNITED STATES PATENT AND TRADEMARK OFFICE

CERTIFICATE OF CORRECTION

PATENT NO. : 5,312,219

DATED : May 17, 1994

INVENTOR(S) : Frederick L. Brown

It is certified that error appears in the above-indentified patent and that said Letters Patent is hereby corrected as shown below:

Title page, Abstract, lines 1-8:

Please substitute the following Abstract of the Disclosure for the printed Abstract:

A forklift truck has front and rear wheeled sections coupled by a central pivot. The wheels of the rear section are driven independently of one another. In order to prevent tire scrub when the two sections are at an extreme turning angle in which the center of turning lies under or close to one of the driven wheels, the driving of the rear wheels is controlled to stop or reverse the drive of one of the wheels.

Signed and Sealed this

Thirtieth Day of August, 1994

Attest:

BRUCE LEHMAN

*Attesting Officer*

*Commissioner of Patents and Trademarks*